Patented Mar. 27, 1923.

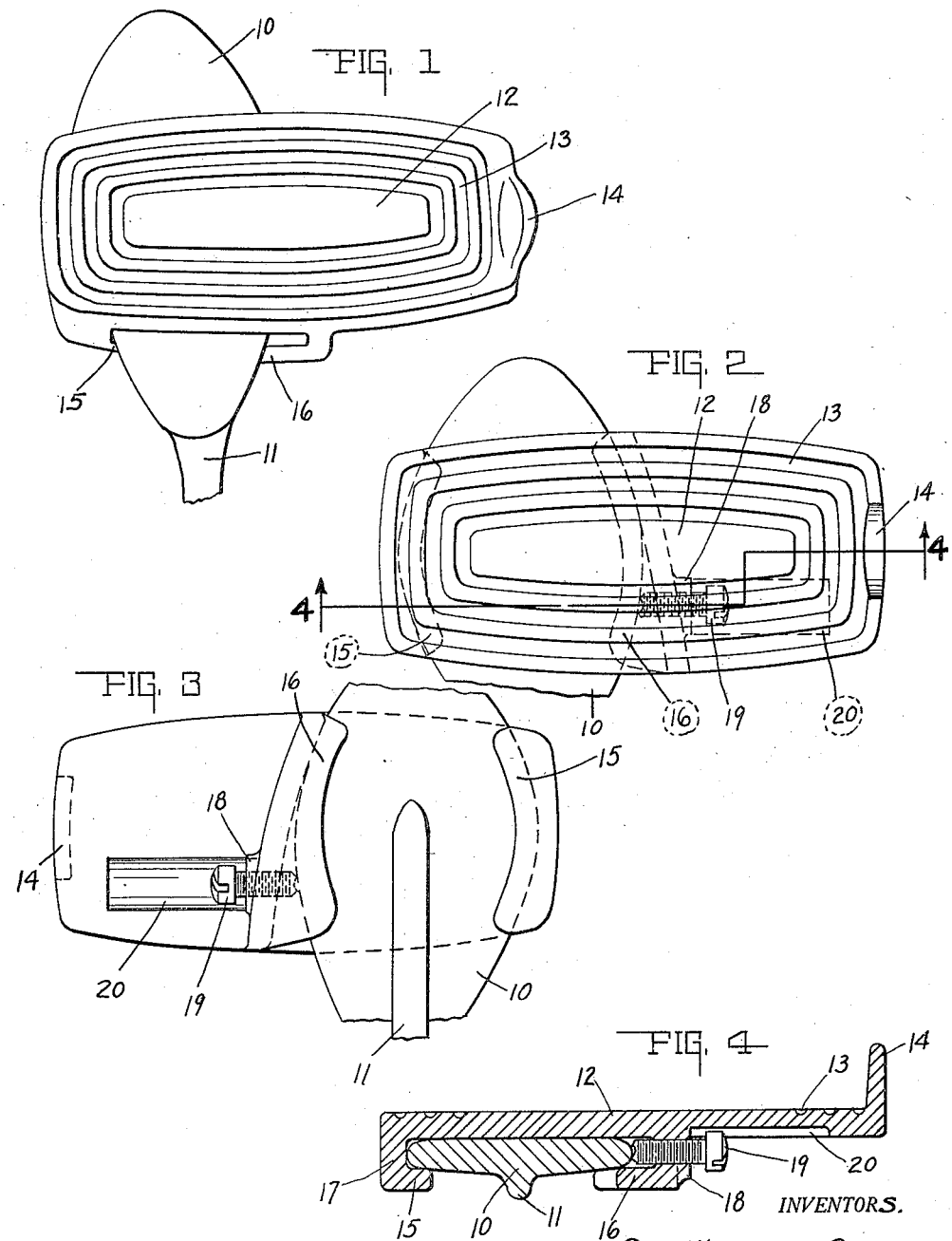

1,449,990

UNITED STATES PATENT OFFICE.

WILLIAM GRUND AND ROBERT L. GARDINEER, OF KOKOMO, INDIANA.

ATTACHMENT FOR FOOT PEDALS.

Application filed September 11, 1922. Serial No. 587,425.

*To all whom it may concern:*

Be it known that we, WILLIAM GRUND and ROBERT L. GARDINEER, citizens of the United States, and residents of Kokomo, county of Howard, and State of Indiana, have invented a certain new and useful Attachment for Foot Pedals; and we do hereby declare that the following is a full, clear, and exact description thereof, reference being had to the accompanying drawings, in which like numerals refer to like parts.

This invention relates to an auxiliary foot plate for clutch and brake pedals for automobiles and the like, and particularly to that type of pedal used on Ford automobiles.

The principal object of the invention is to provide a foot plate which may be readily and quickly secured upon the pedal for giving a broader engaging and non-slipping surface for the operator's foot than is found in the usual foot pedal.

The principal feature of the invention lies in the construction of the attachment wherein it may be slipped over the foot pedal and quickly locked in place thereon by means of a single screw, the attachment being made of a single casting rather than having a plurality of fittings.

Still another feature of the invention resides in the construction of the clamping members formed on the attachment which are adapted to closely embrace the curved edges of the pedal, although rigidly formed or cast upon said attachment, with the aid of only a single clamping screw.

The full nature of the invention will be understood from the accompanying drawings and the following description and claims.

In the drawings, Fig. 1 is a perspective view of the pedal attachment mounted on the pedal. Fig. 2 is a plan view thereof. Fig. 3 is a plan view of the under side of said attachment. Fig. 4 is a section taken on the line 4—4 of Fig. 2.

In the drawings there is shown a foot pedal 10 mounted upon an arm 11, said pedal comprising a flat plate substantially elliptical in outline. The attachment adapted to be mounted upon the pedal for presenting a non-slipping surface and increasing the width thereof so as to prevent the operator's foot from slipping off the pedal consists of the plate 12 provided with a plurality of grooves 13 forming a non-slipping surface. On one end of the plate 12, there is an ear 14 against which the side of the operator's foot may rest for preventing it from slipping therefrom.

For securing the attachment on the plate 12 of the pedal, there is provided a curved gripping flange 15 on the under side thereof, said flange being so curved as to conform to the curvature of the side of the pedal 10. The flange 15 is spaced from the under side of the plate 12 sufficiently to permit the edge of the foot pedal to extend therebetween, as shown in Fig. 4. Opposite the flange 15 and substantially midway of the plate 12, there is provided a gripping flange 16 similarly spaced from the bottom of the plate 12 and extending inwardly toward the flange 15. Said flange 16 is provided with a curved edge to conform to the curvature of the pedal on the corresponding side. While the connecting portion 17 between the flange 15 and said plate has a corresponding curvature in conformity with said flange and the adjacent edge of the foot pedal, the connecting portion 18 between the flange 16 and said plate is only slightly curved or almost straight and disposed at such an angle as to permit the attachment to be readily slid over the widest point in the pedal, as shown in Fig. 3. The angular position of the connecting portion 18, while permitting said attachment to be slid over the widest point of the pedal, engages the edge of the pedal on one side of the widest point and draws the curved connecting portion 17 into direct engagement with the opposite edge of the pedal on each side of the widest point. Therefore, it might be said that the pedal 10 is embraced on three of the four sides. For engaging and embracing the fourth side, there is provided a locking screw 19 adapted to screw through the connecting portion 18 until its end engages and locks the so-called fourth side of the pedal. Each side of the pedal will then be rigidly engaged and embraced by the attachment on each side of its widest point, whereby said attachment will be rigidly and securely held thereon and prevented from coming loose or wobbling in place. For permitting ready access to be had to the screw 19, there is provided a groove 20 in the under side of the plate 12 of sufficient depth to allow the free movement of the screw head.

It is obvious that while the invention is shown herein as formed of a single casting, it may be stamped out of sheet metal in two parts, one part including the plate and the flange formed on the edge thereof, and the other forming the flange through which the screw extends. The last mentioned flange or part may then be welded to the plate so as to then form an attachment embodied in a single piece.

The invention claimed is:

1. The combination with a pedal having tapered ends, and a wider portion substantially midway between the ends thereof so as to form four sides, of an attachment therefor comprising a foot plate, a plurality of depending flanges formed integral with said foot plate and extending parallel therewith toward each other, connecting portions formed between said flanges and plate adapted to engage and embrace three sides of said pedal, and a locking screw adapted to screw therethrough into locking engagement with the fourth side of said plate, whereby said attachment will be rigidly secured thereon and embrace the adjacent edges on both sides of the widest portion.

2. The combination with a pedal having tapered ends, and a wider portion substantially midway between the ends thereof so as to form four sides, of an attachment therefor comprising a foot plate, a plurality of depending flanges formed integral with said foot plate and extending parallel therewith toward each other, connecting portions formed between said flanges and plate adapted to engage and embrace three sides of said pedal, a locking screw adapted to screw therethrough into locking engagement with the fourth side of said pedal, whereby said attachment will be rigidly secured thereon and embrace the adjacent edges on both sides of the widest portion, and an upwardly projecting guard flange formed on one end of said plate and extending perpendicular thereto for preventing the operator's foot from slipping therefrom.

3. The combination with a pedal having tapered ends, and a wider portion substantially midway between the ends thereof so as to form four sides, of an attachment therefor comprising a foot plate, a plurality of depending flanges formed integral with said foot plate and extending parallel therewith towards each other, connecting portions formed between said flanges and plate, one of said connecting portions being curved to correspond to the curvature of one side of said pedal so as to engage the edge thereof on each side of the widest point, and the other connecting portion being formed substantially straight and at an angle so that the forward portion thereof will pass over the wider section of the pedal and the rear portion thereof will engage said pedal adjacent the wider portion, and a clamping screw extending through said forward portion for engaging the edge on the opposite side of the wider point, substantially as described.

In witness whereof, we have hereunto affixed our signatures.

WILLIAM GRUND.
ROBERT L. GARDINEER.